United States Patent [19]

Mueller

[11] 4,153,288
[45] May 8, 1979

[54] FOLDING AIR DEFLECTOR

[75] Inventor: David C. Mueller, Aurora, Colo.

[73] Assignee: Donna M. Mueller, Aurora, Colo.

[21] Appl. No.: 836,663

[22] Filed: Sep. 26, 1977

[51] Int. Cl.² ............................................. B62D 39/00
[52] U.S. Cl. ..................................... 296/1 S; 296/91
[58] Field of Search ................... 296/1 S, 91; 105/2 R

[56] References Cited

U.S. PATENT DOCUMENTS

| | | | |
|---|---|---|---|
| 3,866,967 | 2/1975 | Landry | 296/91 |
| 3,904,236 | 9/1975 | Johnson | 296/1 S |
| 3,999,796 | 12/1976 | Greene | 296/1 S |

FOREIGN PATENT DOCUMENTS 2430063  4/1975  Fed. Rep. of Germany ........... 296/1 S Primary Examiner—Philip Goodman
Attorney, Agent, or Firm—Kyle W. Rost

[57] ABSTRACT

An air deflector of the type having a central deflector surface with hingedly attached lateral wings is supported in deployed position against a frame by upright struts foldable on a pivoted end and engaged in socketed relation to the frame at the opposite end, the struts being urged to remain in socketed engagement by normal wind forces. The lateral wings are held in deployed position by arms also fastened in socketed relation to the frame, and latches on the frame have wind vanes thereon for preventing the latches from becoming disengaged under vibration. A strap provides added tension to hold the deflector in deployed position, or to retain the deflector with wings folded under the central deflector surface in folded position.

5 Claims, 6 Drawing Figures

FOLDING AIR DEFLECTOR

BACKGROUND OF THE INVENTION

1. Field of the Invention

The invention relates to land vehicles, bodies and tops. More specifically, the invention is a folding air deflector for use on an automobile or truck pulling a trailer or similar large load.

2. Description of the Prior Art

Vehicle air deflectors are commonly used to improve gas mileage by reducing drag against a towed trailer. The purpose of the deflector is to direct air currents over the top of the trailer, thus avoiding direct impingement of the air currents against a vertical wall of the trailer.

Applicant is the inventor of a deflector shown in U.S. Design Patent No. 241,531 of which the present invention is an improvement. That deflector, like many others in the art, is attached to the roof of a vehicle for multi-point support against the constant pressure and vibration caused by wind currents. A properly mounted, firmly supported deflector of the configuration shown in the above design patent has been found to increase gasoline mileage by over eighteen percent.

One problem in the use of air deflectors is that the towing vehicle may at times operate without having a trailer attached thereto. In this instance, the deflector is no longer serving a useful purpose and, in contrast, may increase wind resistance against the vehicle, resulting in decreased gasoline economy. It is therefore important that means be provided to remove the deflector from the wind stream. The obvious expedient of removing the deflector from the vehicle is, in practice, unsuitable, as the size of the deflector is often greater than the vehicle width, making it impossible to store the deflector within the vehicle. Further, the mounting of the deflector on the vehicle may be permanent to avoid vibration when the vehicle is travelling at high speed.

Some deflectors are foldable for removal from the wind stream. U.S. Pat. No. 3,822,910 teaches a deflector that can be folded forward by unbolting portions of the associated support frame. U.S. Pat. No. 3,596,974 teaches a deflector that can be pivoted into a horizontal position by merely loosening wing nuts on pivot bolts that hold the deflector at any angle. Both of these deflectors maintain their original size when in folded position and may be strongly acted upon by cross winds or updrafts even when folded out of direct wind currents. Furthermore, the deflector of the latter patent lacks support necessary to prevent damaging vibration when in deployed position. It is therefore desirable to create a deflector that is firmly supported in both deployed and folded positions, and that presents a reduced size to the wind when the deflector is folded. In addition, it is desireable for a deflector to be uniquely supported so that wind currents assist in maintaining the deflector in deployed position, and so that the deflector can be folded in a matter of seconds without tools.

The present invention attempts to remedy the above noted problems of the prior art while achieving the stated desirable goals.

SUMMARY OF THE INVENTION

A vehicle air deflector of the type having a central deflector surface flanked by lateral wings is supported by a base frame attachable to the vehicle and a superstructure supporting the deflector surface and wings. The superstructure is pivotally attached to the base frame at its forward end, while it is releasably supported in deployed position by a strut connected between the rear of the base frame and superstructure, the strut being attached at one end by pivotal means and attached at the other by socketed connection such that the normal impact of wind on the deflector surface urges the strut to remain in the socketed connection. The lateral wings are hingedly connected to the central deflector surface and are held in deployed position by an arm pivotally connected at one end between the wing and base frame and connected by socket means at the other end. Wind forces against the arm aid in holding the socketed connection together, and, in addition, a latch having a wind vane thereon holds the socketed connection together. A strap between the base and superstructure provides tensioning means that also holds the deflector in either deployed or folded positions. When the deflector is folded, the wings are brought between the superstructure and base frame on their hinged attachment to the central deflector surface for reducing the size of the deflector.

The main object of the invention is to create a deflector that is adequately supported in both deployed and folded positions for vibration free performance, while allowing the deflector to be moved between the two positions without the use of tools and in a brief time.

An important object is to create a framework that releasably supports a deflector in either deployed or folded position, allowing the effective size of the deflector to be reduced in folded position for less interaction with wind currents.

Another important object is to create a foldable frame that is aided by normal wind currents during vehicle motion in retaining the deflector in deployed position.

DESCRIPTION OF THE PREFERRED EMBODIMENT

Figure 1:
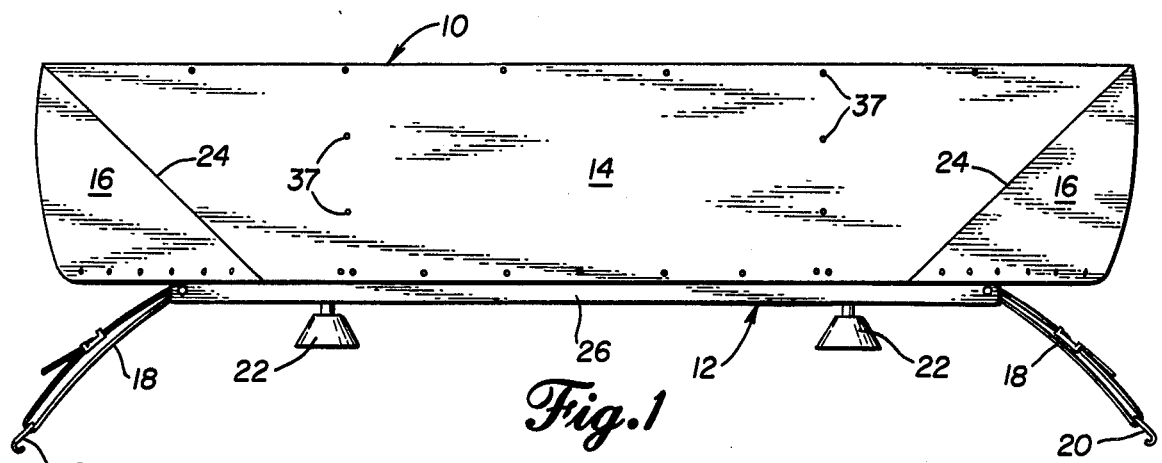
FIG. 1 is a front elevational view of the deflector in deployed position.
Figure 2:
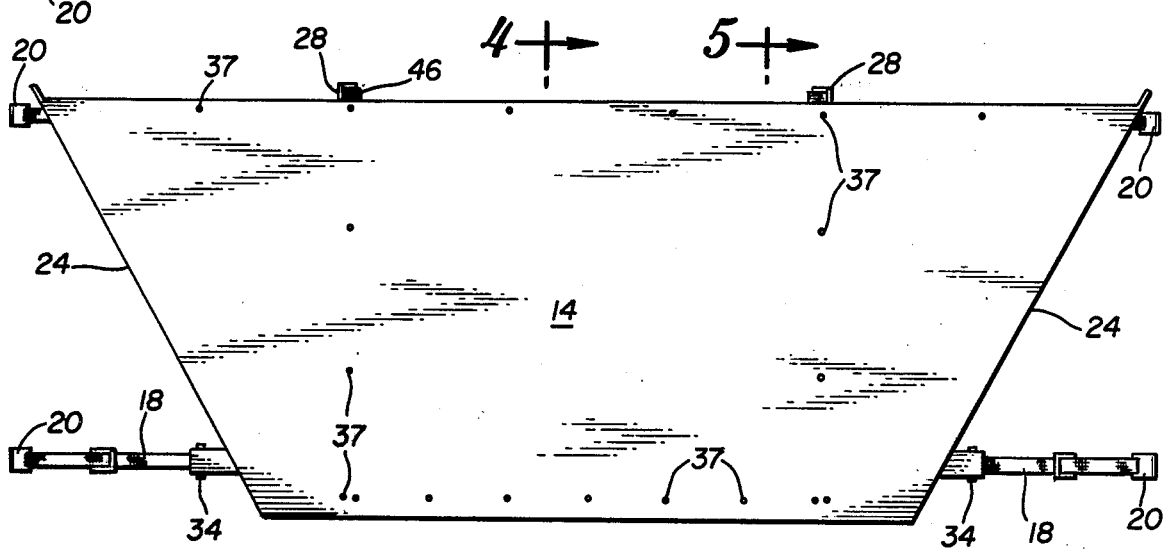
FIG. 2 is a top plan view of the deflector of FIG. 1.

The air deflector assembly 10 includes a supporting framework 12 carrying deflector means including a central body of sheet material 14 having lateral wedge-shaped deflector wings 16 depending from the side edges thereof. The entire deflector is attached to the top of a vehicle 17 such as a truck or automobile by fasteners such as conventional adjustable straps 18 having padded hooks 20 thereon for engaging the gutters or other side portions of the vehicle. Frame 12 may have nonmarrying support feet 22 constructed of rubber, plastic, or like resilient material for resting directly against the vehicle top.

The central body 14 and lateral deflectors 16 are constructed of a single sheet of flexible material, for example polypropylene having a thickness of approximately 60 mil to provide sufficient strength and rigidity to adequately deflect wind at velocities that might be encountered at highway speeds without undue distortion. Between each lateral deflector 16 and main body 14 is hinge 24, which may be mechanically attached or, in the preferred form, is created by scoring the plastic sheet material to establish a natural fold line.

Figure 3:
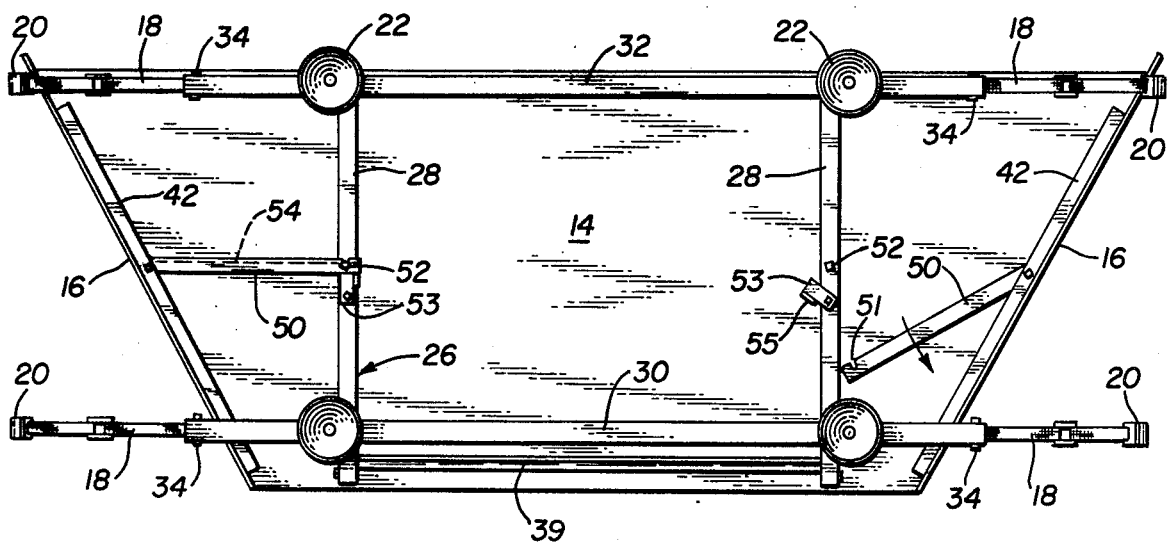
FIG. 3 is a bottom view of the deflector of FIG. 1.

The frame, as best shown in FIG. 3, includes a rigid base 26 having longitudinal members 28 connected by forward transverse stringer 30 and rear transverse stringer 32, forming a rectangle with the ends of each component member extending beyond the boundry of the rectangle. The transverse stringers 30 and 32 are the lower members of the rectangle and may be formed from square aluminum tubing having a pin or bolt 34 passing through each end thereof as an attaching device for strap 18, which is looped around element 34. Likewise, feet 22 are attached by passing a bolt through stringers 30, 32 just outside the outline of the rectangle.

Members 28 are preferably formed from L-shaped extrusions with the base of the L bolted directly against the stringers and the vertical side of the L at the outside edge of the base, defining the lateral extreme of the rectangle.

In addition to base 26, the frame 12 includes superstructure 36 that is directly fastened to the sheet material of the deflector means, for example by rivets 37 or like fasteners. A transverse member 38, FIG. 4-6, extends for almost the entire width of deflector sheet 14 at the rearward edge thereof, and a forward transverse member 39, FIG. 3, extends along the forward edge of sheet 14. Longitudinal members 40 extend between members 38 and 39 in approximately the same vertical longitudinal plane as would include members 28. Thus, members 38, 39, and 40 form a rectangle in the superstructure 36 with approximately the same width as the rectangle in the base frame. The superstructure may be formed from L-shaped extrusions that are welded together at points of intersection. The vertical side of the L may be at the outer side edge of members 40. Additional superstructure members 42 are fastened along the lower edges of lateral deflectors 16.

Figure 4:
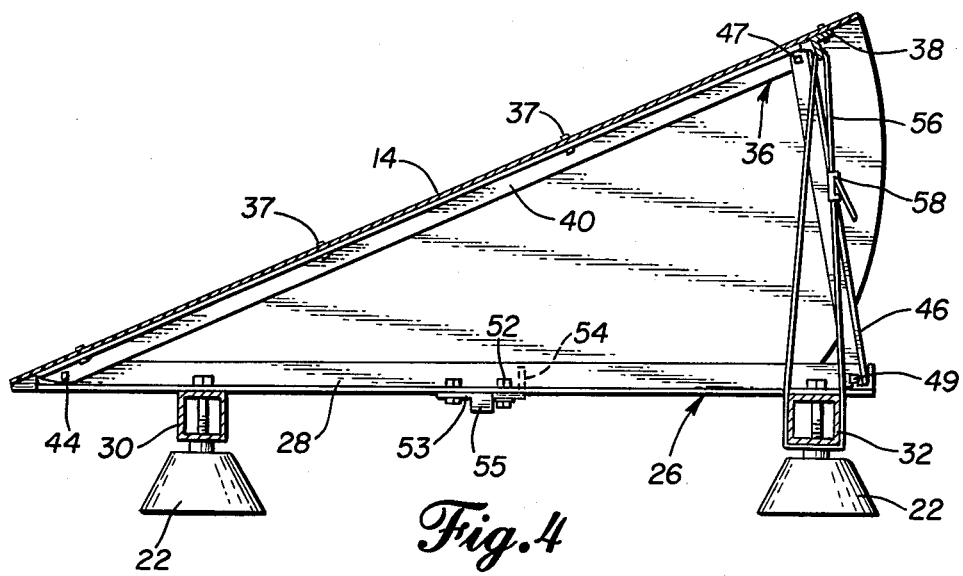
FIG. 4 is a vertical cross sectional view taken along the plane of line 4—4 of FIG. 2.
Figure 5:
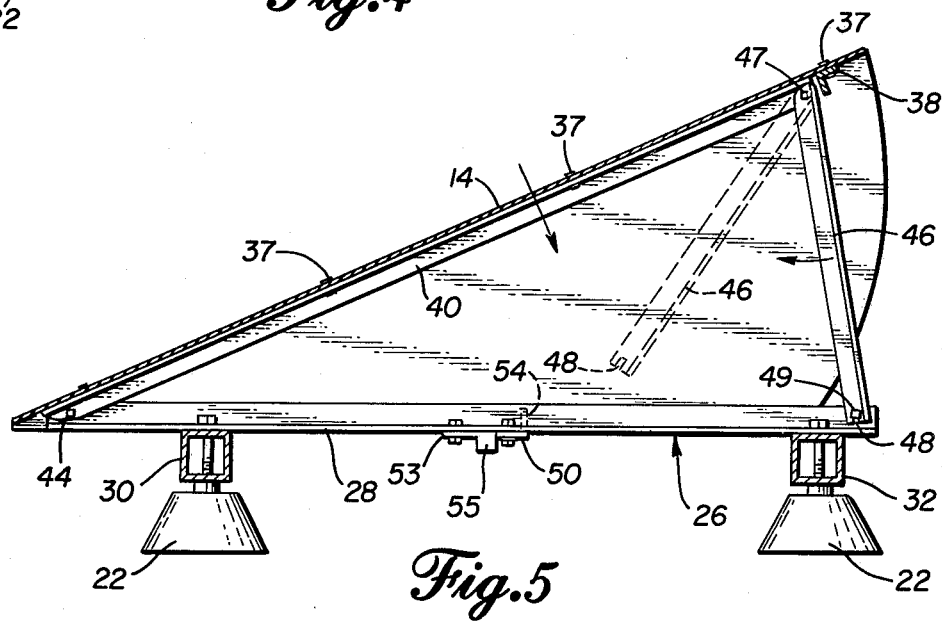
FIG. 5 is a vertical cross sectional view taken along the plane of line 5—5 of FIG. 2, showing in phantom the motion of a support strut.

The base 26 and superstructure 36 are joined together by pivot pins 44 joining the forward tips of members 40 to corresponding members 28, FIG. 4 and 5. A pair of struts 46 is pivotally attached to the superstructure, for example by pin 47 attaching a strut 46 to each member 40 adjacent its attachment to member 38, and the lower end of each strut is notched at 48 to be received over an appropriately sized pin 49 on the rearward end of each member 28. When the struts 46 are attached to the pins 49, the superstructure and hence the deflector means is supported at an acute angle to the plane of base 26, for example at 27.7 degrees.

Members 42 are also supported at a desired position by connecting arms 50, pivotally attached at one end to members 42 and having a longitudinally facing notch 51 near the opposite end for engagement with a downwardly extending pin 52 on members 28. As best shown in FIG. 3, connecting arms 50 are locked into engagement with pins 52 by a pivotable latch 53. Arms 50 are preferably formed from L-shaped extrusions with the vertical side of the L removed near notch 51 so that only the horizontal base of the L overlaps member 28, as suggested by the dashed representation of the vertical side 54 of the extrusion shown at the left hand side of FIG. 3. Vertical side 54 is squarely abutting the corresponding vertical side of each member 28, creating an exceptionally rigid union. Each latch 53 may have a horizontal base adjacent to member 28 and a depending vertical tab 55 near the free end of the latch. Tab 55 serves as a finger hold and also as a wind vane that assists in keeping the latch in fastened position when, as shown in FIG. 3, the latch is forward of the pin 52 and the notch 51 is in the rearward facing edge of arm 50.

When struts 46 and arms 50 are attached between the base and superstructure, the deflector 10 is fully supported in deployed position as shown in FIGS. 1-5. The wind forces striking the deflector during vehicle movement will constantly urge struts 46 into firm contact with pin 49, and likewise will urge latch 53 to remain in fastened position. Vertical side 54 of arm 50 is also urged by wind forces to hold the arm in engaged position on pin 52.

Figure 6:
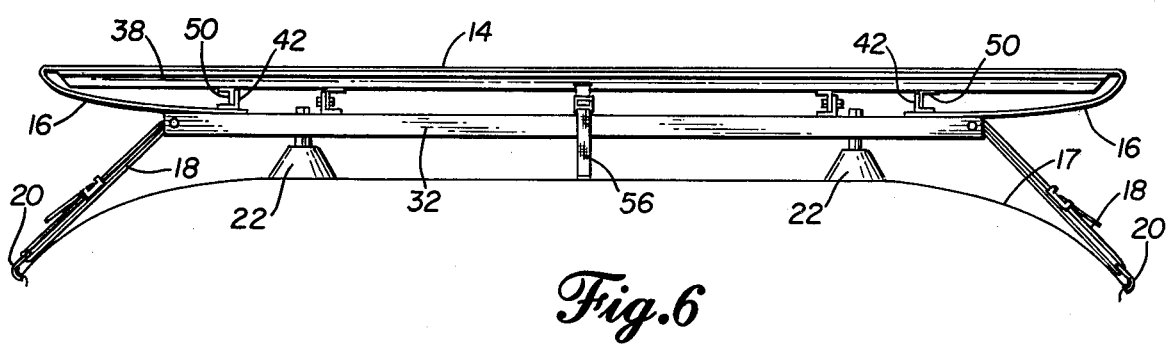
FIG. 6 is a rear elevational view of the deflector in folded position atop a vehicle.

The deflector can be folded into flat position shown in FIG. 6 while remaining on the vehicle by folding struts 46 as suggested by the dashed position shown in FIG. 5, and folding arms 50, as shown at the right hand arm of FIG. 3. Strut 46 fits flush against member 40, parallel to surface 14, and arm 50 fits flush against member 42, parallel to surface 16. The superstructure then pivots at 44 against the base frame, while lateral deflectors 16 are folded inwardly at 24 and retained between stringers 30, 32 and deflector body 14.

While in either deployed or folded positions, the deflector 10 may be held by strap 56 against unwanted motion. This strap may be connected to both transverse member 38 and transverse stringer 32 and tensioned to any desired degree by a conventional friction buckle 58. As shown in FIG. 4, when the deflector is deployed the strap 56 aids in locking strut 46 against pin 49, and as shown in FIG. 6, when the deflector is folded the strap retains the entire structure in compact position.

When in folded position, the deflector is of smaller effective size due to the positioning of lateral deflectors 16 between the base and superstructure frames. Cross winds have little disrupting effect on the vehicle, and the deflector as a whole has almost no negative impact on gasoline mileage. Struts 46 and arms 50 are axially alinged with the direction of normal wind current and are supported against unfolding by contact with various parts of the air deflector.

While the engagement of struts 46 and arms 50 with the base frame has been described to include a slot in the strut or arm mating with a pin in the frame, other equivalent mating devices could be employed, maintaining the described advantage of having the wind forces of normal vehicle motion urge the mating parts to remain together. The pins 49 and 52 preferably have an enlarged head for retaining the respective mating slots against axial movement on the pin. One possible pin construction includes a bolt and self locking nut thereon, with a spacer of smaller diameter than the bolt head or nut for direct engagement in the appropriate slot.

The above description of the invention is intended to be by way of example and not limitation, as various equivalents could be employed without departing from the scope of the invention.

I claim:

1. An improved vehicle air deflector assembly of the type having a framework with means thereon for connecting the framework to the top of a towing vehicle, and deflector means including both a central deflector of sheet material supported on said framework in a first position at an upward and rearward acute angle relative to the vehicle top and a pair of side deflectors depending from the opposite lateral sides of the central deflector in a deployed position, wherein the improvement comprises:

(a) said framework having a base frame and a superstructure with a pivotal attachment therebetween near the forward edge of the base frame, the superstructre being foldable along said pivotal attachment between said first position and a second folded position wherein the rear end of central deflector is lowered rearwardly until approximately parallel to the vehicle top;

(b) a support strut releasably connected between the base frame and superstructure near the rear ends thereof for selectively maintaining the framework in the first position;

(c) spacing means releasably connected between each of said side deflectors and the base frame for selectively holding each side deflector in deployed position when so connected and allowing the side deflectors to be folded under said central deflector when released from connection; and (d) hinge means connecting the central deflector with the side deflectors for pivoting the side deflectors into a mutually inwardly folded position approximately parallel to the central deflector to reduce the effective size of the deflector means when the framework is in said second position.

2. The deflector assembly of claim 1, wherein said support strut comprises a pivotal mounting on one end thereof attaching the strut to the superstructure and a socket mounting releasably engageable with strut mating means on the base frame at the opposite end thereof, said socket mounting aligned for continuously urged engagement with the strut mating means in response to air impingement against the forward side of the deflector assembly when the framework is in said first position.

3. The deflector assembly of claim 2, further comprising an adjustable tensioning strap connecting the base frame and superstructure near the rear end thereof for maintaining said socket mounting of the support strut in position engaging the base frame in said first position and holding the superstructure near the base frame when in said second position.

4. The deflector assembly of claim 1, wherein said spacing arm comprises a pivotal mount on one end thereof connecting the arm to the side deflector, and a socket mounting on the other end thereof releasably attaching the arm to the base frame, said socket mounting engaging arm mating means on the base frame when in said first position, the base frame further comprising a pivotal latch for locking the socket mounting on the arm mating means, said latch having a wind vane thereon for maintaining the latch in locking position in response to air impingement from the forward side of the deflector assembly.

5. The deflector assembly of claim 4, wherein said base frame comprises a longitudinal member having a substantial vertical face and a horizontal face carrying said arm mating means, and said arm extends transversely to the longitudinal member and has a vertically extending portion that abuts the vertical face of the longitudinal member and a horizontal planar extension that overlaps the horizontal face of the longitudinal member; and wherein said socket mounting of the arm is a slot opening rearwardly in the planar extension of the arm to engage the arm mating means, the vertically extending portion of the arm receiving air from the forward side of the deflector assembly to continuously urge the slot into engagement with the arm mating means.

* * * * *